(12) United States Patent
Nakano et al.

(10) Patent No.: US 6,977,756 B2
(45) Date of Patent: Dec. 20, 2005

(54) ERROR DIFFUSION PROCESSING DEVICE

(75) Inventors: Takahiko Nakano, Ikoma (JP); Motoki Takase, Yamatokoriyama (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 750 days.

(21) Appl. No.: 09/878,394

(22) Filed: Jun. 12, 2001

(65) Prior Publication Data

US 2002/0003632 A1    Jan. 10, 2002

(30) Foreign Application Priority Data

Jun. 12, 2000    (JP) .............................. 2000-174822

(51) Int. Cl.[7] .......................... G06K 15/00; H04N 1/405
(52) U.S. Cl. ..................... 358/3.03; 358/1.9; 358/3.01; 382/252
(58) Field of Search ................................. 358/3.03, 1.9, 358/3.01, 3.04, 3.05; 382/252

(56) References Cited

U.S. PATENT DOCUMENTS

| | | |
|---|---|---|
| 5,519,791 A | 5/1996 | Webb et al. |
| 5,553,165 A | 9/1996 | Webb et al. |
| 5,892,851 A | 4/1999 | Nguyen |
| 5,931,960 A * | 8/1999 | Kletter et al. ................ 714/704 |
| 6,594,035 B1 * | 7/2003 | Kresch et al. .............. 358/3.03 |
| 6,693,727 B1 * | 2/2004 | Kanno et al. ............... 358/3.03 |

FOREIGN PATENT DOCUMENTS

| | | |
|---|---|---|
| JP | A575863 | 3/1993 |
| JP | 5-282473 A | 10/1993 |
| JP | A 683731 | 3/1994 |
| JP | A6 266324 | 9/1994 |
| JP | 7-20839 A | 1/1995 |
| JP | 8-287038 A | 11/1996 |
| JP | A8 317211 | 11/1996 |
| JP | A11 146202 | 5/1999 |

* cited by examiner

Primary Examiner—Thomas D. Lee
(74) Attorney, Agent, or Firm—Birch, Stewart, Kolasch & Birch, LLP

(57) ABSTRACT

A data driven type processing device has an error diffusion computing unit built therein. An error holding register is provided within the error diffusion computing unit, and is used to successively store and update a value of error information of a pixel that is to be diffused to a neighboring pixel being processed continuously. An error data memory is provided outside the computing unit, and is used to store and update a value of the error information that is to be diffused to another neighboring pixel being processed discontinuously. The error information and the values to be diffused are stored in a packet, and the packet is circulated for operation.

8 Claims, 6 Drawing Sheets

FIG.1
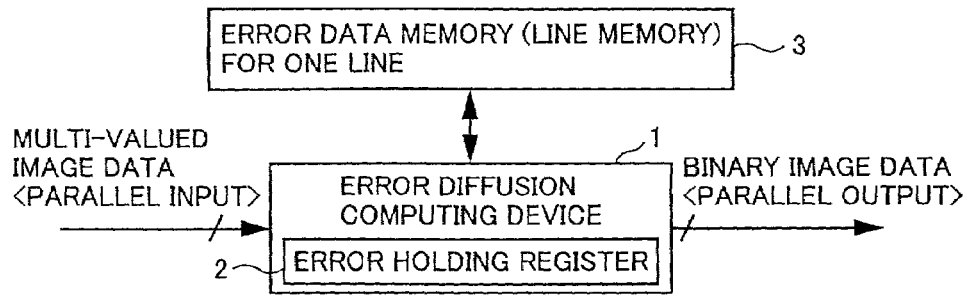
FIG.2
| PIXEL | OPERATION CYCLES | | | | | | | |
|---|---|---|---|---|---|---|---|---|
| | 1 | 2 | 3 | 4 | 5 | 6 | 7 | 8 |
| 1 | R | M | W | | | | | |
| 2 | | R | M | W | | | | |
| 3 | | | | | R | M | W | |
| 4 | | | | | | R | M | W |
| TARGET PIXEL | 1 | 2 | 1 | 2 | 3 | 4 | 3 | 4 |
R: READING FROM MEMORY
M: ERROR COMPUTATION
W: WRITING TO MEMORY
TARGET PIXEL: NUMBER OF PIXEL NOW ACCESSING THE MEMORY
FIG.3
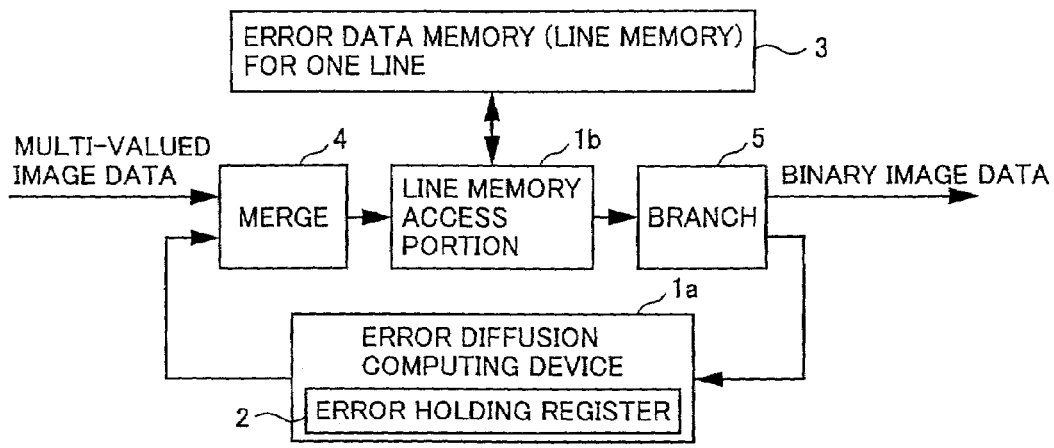

DIRECTIONS OF ERROR DIFFUSION
AND COEFFICIENTS

ERROR HOLDING REGISTER

◎: TARGET PIXEL

COEFFICIENTS OF ERROR

◉: TARGET PIXEL

ERROR DIFFUSION PROCESSING DEVICE

BACKGROUND OF THE INVENTION

1. Field of the Invention

The present invention relates to error diffusion processing devices. More particularly, the present invention relates to an error diffusion processing device that uses a data driven type processing device to perform an operation for error diffusion.

2. Description of the Background Art

Error diffusion is a technique that is necessary when a printer or display device is so low in quantization level of an image, as in a facsimile device, that intermediate tones cannot be expressed when an image is taken in, processed and output with such a low quantization level unaltered. In other words, the technique is used when the quantization level of an output device like a display device or printer is lower than the quantization level when input from a reading device. More specifically, the technique is necessary in the case where, while the reading device has a multi-valued, e.g., 8-bit, analog to digital (A/D) converter, the display device is for binary display, so that the quantization level of the read image should be decreased accordingly.

When the quantization level is being decreased from the multi-valued level to the binary level, there is a possibility that the intermediate tones of the multi-valued images and hence continuity thereof will be lost. The error diffusion is the technique to express such continuity held by the multi-valued images in a pseudo manner. In other words, even if the quantization level of the output device is low, the technique enables the pseudo intermediate tones to be expressed, and thus, by increasing the quantization level of the reading device, it becomes possible to obtain a better image without altering the output device.

FIGS. 10A and 10B illustrate the error diffusion process. In FIGS. 10A and 10B, each rectangle represents a pixel, and a pixel being processed, or a target pixel, is marked with ⊚. It is assumed that the quantization is conducted from top to bottom in an image, and from left to right on a line. Shaded rectangles represent those for which the quantization has been completed. Comparing FIG. 10A with FIG. 10B, it is shown that the quantization has advanced one pixel to the right. The method of error diffusion illustrated herein is to distribute (or to diffuse) quantization error of the target pixel to its neighboring four pixels for which the quantization is not yet done, by multiplying the error by specific ratios of a, b, c and d, respectively. As shown in FIGS. 10A and 10B, the error of the pixel having undergone the quantization is successively distributed to the pixels having not yet undergone the quantization, so that the pixels should be processed one by one in order, with sequential processing. Thus, in the error diffusion, the sequential processing is required for each error, and real-time processing is necessary to complete the processing at a rate with which the images are being sent, and therefore, the sequential processing should be conducted at high speed. To solve these problems, several techniques as follows have conventionally been proposed.

The first example of such conventional techniques is a signal processing device disclosed in Japanese Patent Laying-Open No. 5-75863. This signal processing device includes means for binarizing adjacent pixels in parallel, means for generating the errors, and a filter for averaging the errors. It can downscale a buffer memory, and decrease the number of bits of the binarized errors, or store average values for a plurality of pixels. This technique is advantageous in that the memory region as well as the number of memory access times is reduced, allowing for speeding. The disadvantage is that the algorithm for error diffusing processing is specialized, so that it cannot be used when it does not agree with a required specification.

The second example of the conventional techniques is method and device for image processing disclosed in Japanese Patent Laying-Open No. 6-266324. In this example, binarization and error diffusion are performed for each scanning line, and the error data are stored in an error data storing memory for a next stage. Error diffusion instructions are then carried out in parallel for the respective scanning lines. The advantage of this technique is that computing units for error diffusion are provided in parallel, and paths for propagation of the error data among the computing units are also provided, so that parallelism is ensured to perform essentially parallel operations. This technique, however, exhibits a problem that, as it includes such parallel computing units for the error diffusion, the number of circuits is increased by α, corresponding to the number of such parallel computing units plus the one for coupling those parallel circuits.

The third example of the conventional techniques is method and device for block parallel error diffusion disclosed in Japanese Patent Laying-Open No. 6-301364. In this technique, an input image is divided into a plurality of blocks, and error diffusion is conducted for each block. Additional processing is conducted for the boundary of the blocks, so as to realize high-speed parallel processing. The advantage of this technique, as in the second example, is that parallel circuits are provided, and thus, it is possible to increase the operation speed in proportion to the circuit scale. This however poses a problem, again as in the second example, that the circuit scale will be increased proportional to the number of parallel elements.

The fourth example of the conventional techniques is method and device for parallel error diffusion disclosed in Japanese Patent Laying-Open No. 7-20839. In this example, a plurality of error diffusion circuits are provided so as to increase the entire speed without increasing the speed of the respective circuits. This technique again exhibits the same advantage and disadvantage as in the second and third examples.

The fifth example is an image processor disclosed in Japanese Patent Laying-Open No. 8-317211. In this example, image data of one raster is taken in and processed using a number of parallel computing units corresponding to one raster that can access data of neighboring four pixels. The computing units are not dedicated to the error diffusion, and therefore, it is unnecessary to add circuits for the processing. However, the circuit scale allowing the image of one raster to be taken in and to be processed in parallel becomes necessary.

The sixth example of the conventional techniques is a halftone processing method disclosed in Japanese Patent Laying-Open No. 10-334231. In this example, each pixel line is divided into a plurality of segments, and these multiple segments are processed in parallel for error diffusion, with a cut filter being used for a pixel immediately before the boundary of the segments and a normal filter for the other pixels. With this technique, it is possible to realize parallelism of the error diffusion within a pixel column without degrading the image quality. In other words, the error diffusion that should be conducted with sequential processing can be done with parallel processing. This however poses a problem, as in the other examples, that a series of pixels are divided into segments and processed segment by segment in parallel, so that the circuit scale is increased according to the number of parallel elements.

The seventh example is image processor and error diffusing processing method disclosed in Japanese Patent Laying-Open No. 11-146202. In this example, quantization error of a target pixel in a raster is obtained by predicting it from the quantization error in the preceding raster. Thus, in practice, it becomes unnecessary to wait for a processing result of the immediately preceding pixel to arrive before starting processing of the target pixel. Accordingly, using parallel processors, simultaneous processing of a plurality of pixels and also batch processing of all pixels within the same raster become possible.

These conventional techniques are classified into two groups: one for attempting speeding of processing by reducing the number of memory accesses as in the first and seventh examples; and the other for attempting speeding of processing by increasing the processing amounts between parallel processing as in the second through sixth examples.

In addition to the above-described techniques, a data driven type information processing device is proposed which performs parallel processing and thus has attracted attention as an image processing device for use in high-speed processing of a large amount of operations, e.g., for image processing. For such a data processing device performing the data driven type information processing operation, a data transmitting device employing non-synchronous handshake has been utilized. This sends/receives a data transfer request signal and a transfer permission signal indicating whether the data transfer is permitted, to effectually perform data transfer. The detail thereof is described in Japanese Patent Laying-Open No. 6-83731 by the applicant of the present invention.

A data driven type information processing device is provided with necessary circuits including computing units and memories, and the computing units are located within the information processing device. In the data driven type information processing device, as implied by the name, data drives each computing unit within the processing device, and each computing unit is allowed to start processing once data to be processed (to be operated) are ready therein.

In the data driven type information processing device, the data flows through respective computing units in the form of packets. Each packet consists of data and a portion called a tag containing data identification information. The operations are conducted according to the flow of these packets.

FIG. 11 shows a model of the computing unit in the data driven type information processing device. FIG. 12 shows a model of the packet.

As shown in FIG. 11, the computing unit 101 receives and processes data in the form of two packets, input packets 1 and 2, and outputs the result as an output packet. When data to be operated arrives at computing unit 101 as input packet 1, computing unit 101 holds the data included in input packet 1 and waits for arrival of its counterpart of operation. Upon arrival of input packet 2, when the two packets are recognized as the counterparts of operation, computing unit 101 starts processing. At this time, one packet can contain a plurality of pieces of data, as shown in FIG. 12, to realize parallelism.

Now, the packets will be described in brief with reference to FIG. 12. As explained above, each packet includes two major portions, a portion called a tag and the other containing data. The tag is described in Japanese Patent Laying-Open No. 6-83731, and thus, detailed description thereof will not be provided here. If a packet is considered literally as a parcel or a package, data is packed in the package and the package is sent with a tag or a shipping tag attached thereto. At this time, it will be efficient if more than one piece of data (four in FIG. 12) is contained in one packet. Specifically, overhead required for the operation, e.g., time necessary for packet transfer or delay due to a mechanism for identification of the packet, can be suppressed.

Thus, by increasing the number of pieces of data being contained in a packet, it becomes possible to perform a kind of parallel processing, thereby improving the processing efficiency when seen as the entire processing device. Even in the case of the data driven type, a plurality of computing units may be prepared within the information processing device, and processing can be performed independently from each other in the plurality of data driven type processors. As the plurality of computing units are provided, processing can be conducted sequentially using any idle computing unit, without waiting for completion of the preceding operation. This improves the processing efficiency.

The method for rapid and parallel processing being characteristic of the data driven type information processing device has been described. Instead, a method for speeding packet flow can of course be considered. One way to increase the speed of packet flow is to decrease operation time. This is accomplished not only by simply increasing the processing speed of circuits to reduce time required for operations, but also by decreasing time necessary for reading and writing of operation results.

In the error diffusion, sequential processing is conducted wherein one pixel is subjected to processing after the processing of the previous pixel is completed, and a large amount of processing is required for one pixel. With a method using a plurality of identical computing units, the circuit scale would be increased, and sending/receiving of error data between the computing units and their timings would become complex. Thus, it is considered that a method using packets each containing a plurality of pieces of data will be advantageous.

As described above, if a data driven type information processing device can be used for the error diffusion process, a processing device promising high-speed processing and advantageous in terms of circuit scale is expected.

However, if the conventional techniques described above as the first through seventh examples are applied to such a data driven type processing device, the following problems will arise.

First, the technique of the first example employs a specialized algorithm as described above, and is not for use in general purposes. It cannot be applied to a data driven type processing device.

Referring to the second, third and fourth examples, these processing methods employing computing circuits placed in parallel may be used for the data driven type. However, they cannot be applied to parallel processing of the type in which a plurality of pieces of data are processed packet by packet (i.e., parallel processing using packets each containing a plurality of pieces of data).

Referring to the fifth example, the computing unit is not dedicated to the error diffusion. If it is employed for the error diffusion, circuit scale large enough to take in image data for one raster will be necessary.

The technique of the sixth example is again the technique to process distant pixels in parallel, as in the other examples. It cannot be used for the parallel processing for use in the data driven type in which neighboring pixels are contained in one packet.

The technique of the seventh example is characterized by a computing device predicting error diffusion. Like the first example, it is not for use in general purposes, and cannot be applied to the data driven type processing device.

A data driven type processing device is capable of processing a plurality of pieces of data contained in one packet, so as to increase the execution speed. However, the error diffusion requires sequential processing, and the parallel processing is inappropriate therefor. The parallel processing described in the second through sixth examples above, except the fifth example, employs a plurality of error computing circuits to perform processing block by block. Such parallel processing cannot be applied to the parallel processing as in the data driven type that employs packets each containing a plurality of pieces of data.

The fifth example discloses the technique to take in all the pixel data for one raster and to use a plurality of computing units in parallel to increase the processing speed. Such a technique is inapplicable either, as it would simply increases the circuit scale.

SUMMARY OF THE INVENTION

Therefore, a main object of the present invention is to provide an error diffusion processing device suitable for a data driven type information processing device characterized by high-speed operation using parallel processing.

In summary, according to an aspect of the present invention, a data driven type processing device with an error diffusion computing unit built therein includes: an error holding register provided in the error diffusion computing unit for successively storing and updating a value in error information of a pixel that is to be diffused to a neighboring pixel being processed continuously; and an error data memory provided external to the error diffusion computing unit for storing and updating a value in the error information that is to be diffused to another neighboring pixel being processed discontinuously. The error information and the values to be diffused are stored in a packet, and the packet is circulated for operation.

Thus, according to the present invention, it is possible to prevent a decrease in speed due to a need to access a memory outside the error diffusion computing unit. Further, the error holding register is provided within the error diffusion computing unit, so that the present invention can be employed in the case where a plurality of pieces of data are contained within a packet as a unit of data processing.

The error diffusion computing unit is characterized in that it includes a plurality of computing units for parallel processing, which commonly access the error holding register and the external memory, and the information to be processed is stored within a same packet.

In this case, the plurality of pieces of data can undergo parallel processing. Thus, if the number of data blocks within the same packet is increased, the advantage of such a data driven type processing device can further be enjoyed.

Moreover, the error diffusion computing unit is characterized in that it clears a content of the error holding register if a pixel to be processed is located in the head position on a line.

Still further, the error diffusion computing unit is characterized in that it suppresses reading from the external memory if a pixel to be processed is located on the top line of an image screen.

These facilitate special processing conducted when the target pixel is located at an edge of the image.

According to another aspect of the present invention, a data driven type processing device with an error diffusion computing unit built therein includes an access portion accessing an external memory. The error diffusion computing unit includes an arithmetic portion provided separately from the access portion for accessing an error holding register built in the error diffusion computing unit to perform an operation for error diffusion. Error information and values to be diffused are stored in a packet, which is circulated through the access portion and the arithmetic portion for operation.

Thus, according to the present invention, the error holding register is built in the error diffusion computing unit, so that pseudo parallel processing is enabled, and also the number of accesses to the memory outside the error diffusion computing unit can be reduced. Further, it becomes possible to store error data in a small memory capacity, so that the cost of memory is reduced. In addition, it becomes possible to prevent a decrease of speed because of accessing a memory outside the error diffusion computing unit. As the error holding register is provided within the error diffusion computing unit, the present invention is applicable to the case where a plurality of pieces of data are stored in a single packet as a unit of data processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing an error diffusion processing device according to an embodiment of the present invention.

FIG. 2 illustrates operation cycles according to an embodiment of the present invention.

FIG. 3 is a schematic block diagram showing an error diffusion processing device according to another embodiment of the present invention.

DESCRIPTION OF THE PREFERRED EMBODIMENTS

Figure 4:
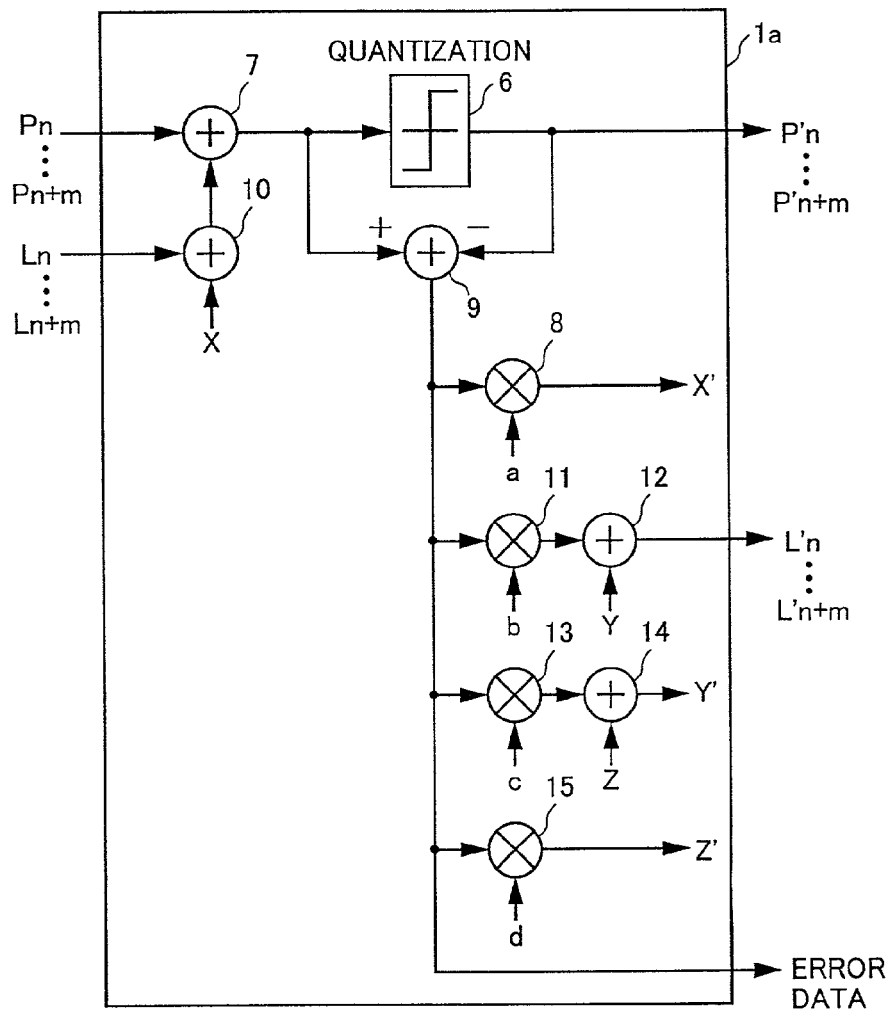
FIG. 4 shows an error diffusion computing device 1a according to a specific embodiment of the present invention.

FIG. 1 shows a basic concept of an embodiment of the present invention. Referring to FIG. 1, the error diffusion computing device 1 is a computing device of data driven type, which includes, as described in above-mentioned Japanese Patent Laying-Open No. 6-83731, a self synchronous type transfer control circuit for sending/receiving a data transfer request signal and a transfer permission signal indicating whether the data transfer is permitted, to control a pipeline register to hold or output a packet; a pipeline register for holding the packet; a merging portion as packet input means; a branching portion as packet output means; a firing control unit placed between the pipeline registers; an arithmetic circuit; a memory portion; and an error holding register 2. Outside the error diffusion computing device 1, an error data memory 3 formed of a line memory for one line is provided.

As error holding register 2 is provided within error diffusion computing device 1, it becomes unnecessary to access the memory outside error diffusion computing device 1, so that the load can be reduced. This corresponds to speeding of the packet flow in the technique to speed up the process.

If error holding register 2 is not within error diffusion computing device 1, it is necessary to access the external memory for the error diffusion processing of each pixel. This memory access requires a plurality of times of reading and writing. As a specific example, suppose that an error of one pixel is being distributed to the neighboring four pixels. In this case, reading of the error data from the relevant pixel and a series of reading, computing and writing operations of the error data for the respective neighboring four pixels become necessary. Taking up just the memory access, five times of reading and four times of writing in total are required, which should be repeated for every pixel. Compared to one reading and one writing in the case where error holding register 2 is provided, it is apparent that the load is considerably increased. The increase in the number of accesses not only leads to reduction in speed due to the responding time of the memory. It also becomes necessary to reconcile the memory accesses with those of another computing unit. Thus, it reduces the speed more than expected from the number of accesses, and further affects the complexity of the circuit design.

The method as described above is able to process a plurality of pieces of data in one operation, so that the load being applied to input/output with respect to error diffusion computing device 1 can be reduced. Further, if the data are restricted to those of an adjacent pixel, it becomes unnecessary to hold the data being passed between the pixels, so that cost performance including the circuit scale is improved.

In error diffusion computing device 1, error data of neighboring pixels are read and added to data of a current target pixel. At this time, if the error data of the neighboring pixels are read, computed and written into the error data memory within one and the same computing device, the packet of the pixel data would remain within the device from the reading to the writing, which is inefficient. Hereinafter, such a situation will be described giving a simple example.

FIG. 2 shows operation cycles of the error diffusion computing device. For simplification, in FIG. 2, it is assumed that reading from a memory, error computation (e.g., addition of errors, quantization, and multiplication of coefficients), and writing to the memory are each to be conducted in one cycle. To perform the operation for error diffusion using a single computing device, the reading, computation and writing should be conducted serially, which requires three cycles for one pixel. In this case, 4×3=12 cycles will be necessary to process the four neighboring pixels.

However, by separating the line memory access portion accessing the error data memory from the error diffusion computing device, it becomes possible to separate the error computation from the reading/writing with respect to the line memory. Thus, as seen from FIG. 2, the processing of the four pixels can be completed within eight cycles. The target pixel in FIG. 2 represents the neighboring pixel that is accessing the memory in the relevant cycle.

FIG. 2 shows that: reading of error data for pixel 1 from the line memory is conducted in cycle 1; computation of the data for pixel 1 and reading of error data for pixel 2 from the line memory are conducted in cycle 2; and writing of the data for pixel 1 after computation into the line memory and computation of the data for pixel 2 are conducted in cycle 3.

In such a manner, the processing of the neighboring four pixels are completed in eight cycles. As apparent from FIG. 2, this method enables the memory access to be conducted for reading or writing in every cycle, so that it is possible to eliminate the situation where the data remain unnecessarily within the computing device waiting to be processed.

Figure 11:
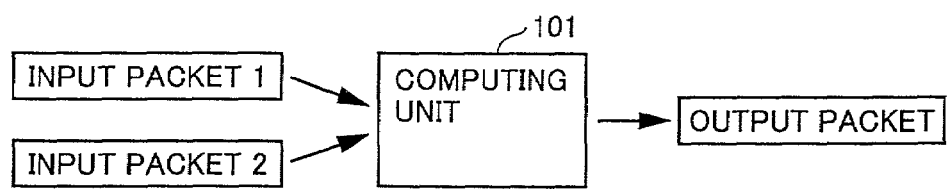
FIG. 11 is a block diagram showing a conventional data driven type information processing device.

FIG. 3 is a block diagram showing a separate type error diffusion computing device according to an embodiment of the present invention. In FIG. 3, the error diffusion computing device 1a has error holding register 2 built therein, as in FIG. 1, which performs quantization, multiplication of coefficients and others. A line memory access portion 1b is provided, separately from error diffusion computing device 1a, for use in accessing error data memory (line memory) 3. A packet of a target pixel for which the error diffusion is to be performed is input via a merging circuit 4 to line memory access portion 1b. Line memory access portion 1b then takes in the relevant error data from error data memory 3, and the packet along with the error data is sent via a branching circuit 5 to error diffusion computing device 1a. Error diffusion computing device 1a performs quantization of the target pixel and distribution of the error. Specifically, it multiplies the quantization error by coefficients and stores the relevant result in error holding register 2. The quantized data along with the result or the data to be stored in error data memory 3 are again sent via merging circuit 4 to line memory access portion 1b. The error data are stored in error data memory 3, and the quantized data (binary pixel data) are output as the operation result. All the data are processed in a packet form as shown in FIG. 11 mentioned above.

When the target pixel is located at the head position on a line, the data stored in error holding register 2 are those for the last position on the line above. Such data are inappropriate as the errors of neighboring pixels to be added at the time of quantization (i.e., they show errors of discontinuous pixels instead of the neighboring pixels), so that the register should be cleared to 0. Error diffusion computing device 1a is provided with this clearing function, which facilitates the control of the device.

As a way of realizing this function, error diffusion computing device 1a may be configured such that it automatically detects that the target pixel is located at the head position on the line and clears error holding register 2 to 0, or an additional instruction may be prepared. A similar function is prepared such that, when the target pixel is located on the top line of an image, error holding register 2 is cleared to 0 and reading of the error data from error data memory 3 is suppressed, because the error data stored in error data memory 3 are the data for the last line of the previous image, i.e., the discontinuous error data. This is enabled by configuring such that error diffusion computing device 1a further detects that the target pixel is located on the top line.

FIG. 4 shows an example of diffusing the error to neighboring four pixels according to an embodiment of the present invention. Now, referring to FIG. 4, a procedure in the case where pixels are processed one by one and the relevant pixels are not at the edge of an image, will be described. The procedure for quantizing a target pixel including multi-valued data, calculating the error, and distributing the error to the neighboring four pixels become as follows.

It is assumed that lines in an image are being processed from top to bottom, and pixels on a line are being processed from left to right. Target pixel data Pn is input to error diffusion computing device 1a. Error data Ln of the pixel on the line immediately above is read from error data memory 3 located outside the error diffusion computing device 1a. The error data Ln . . . , Ln+m read from error data memory 3 and error data X of the immediately left pixel read from error holding register 2 located within error diffusion computing device 1a are successively added in an adder 10, and the results are further added to target pixel data Pn, . . . , Pn+m in an adder 7. The added data are quantized to binary data, for example, by a quantization circuit 6, and an adder 9 determines the quantization error before and after the quantization. A multiplier 8 multiplies the quantization error by an error coefficient "a", and the result is stored as an output X' in a region X of error holding register 2. A multiplier 11 multiplies the quantization error by an error coefficient "b", to the result of which the error data stored in a region Y of error holding register 2 are added by an adder 12, and the results are written into a region Ln of error data memory 3 as outputs L'n, . . . , L'n+m.

Further, a multiplier 13 multiplies the quantization error by an error coefficient "c", to the result of which an adder 14 further adds the error data stored in a region Z of error holding register 2. The result is output as an output Y', which is written into the region Y of error holding register 2. Still further, a multiplier 15 multiplies the quantization error by an error coefficient "d", and the result is stored as an output Z' in the region Z of error holding register 2.

Figure 5A:
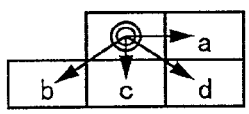
FIGS. 5A-5D illustrate specific operations of the device in FIG. 4.
Figure 5B:
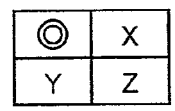
Figure 5C:
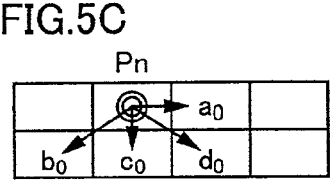
Figure 5D:
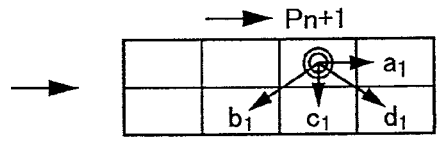

The operations in FIG. 4 will additionally be described with reference to FIGS. 5A–5D. Again in FIGS. 5A–5D, it is assumed that pixels are sequentially processed for error diffusion from top to bottom and from left to right. Thus, the target pixel changes from Pn to Pn+1, with the error being distributed to the neighboring pixels. Error holding register 2 located within error diffusion computing device 1a includes three registers X, Y and Z for a target pixel, as shown in FIG. 5B. Here, error data b0 shown in FIG. 5C is multiplied by coefficient "b", and a value stored in register Y of error holding register 2 is added thereto. The result is written as error data L'n into error data memory 3 located outside the error diffusion computing device 1a and stored therein, since the data will not be used until the processing advances to the next line (i.e., one line below). Accordingly, error data memory 3 shown in FIG. 4 stores Ln, Ln+1, . . . , Ln+m.

Error data a0 is multiplied by coefficient "a", and the result is temporarily stored in register X of error holding register 2 within error diffusion computing device 1a, as shown in FIG. 5B. The data is read out and used as error data X when the next target pixel Pn+1 is processed and input into adder 7 of error diffusion computing device 1a.

Error data c0 is multiplied by coefficient "c", to which the error data stored in register Z is added, and the resultant value is stored in register Y. This value is read out from register Y and used when the next target pixel Pn+1 is processed. Further, error data d0 is multiplied by coefficient "d", and the result is stored in register Z, which is read out from register Z and used when the next target pixel Pn+1 is processed. It is shown in FIGS. 5A–5D that target pixel data Pn, Pn+1, Pn+2, . . . , Pn+m are input sequentially for processing.

The error data shown at the lower right corner of FIG. 4 will be described later in detail.

As described above, in the error diffusion method in which target pixels are advanced while the error data are being diffused to the neighboring pixels, the data necessary in the next process are stored in error holding register 2 located within error diffusion computing device 1a for immediate use, whereas the error data unnecessary until processing of the next line are stored in error data memory 3 located outside error diffusion computing device 1a. Accordingly, the data being stored in error holding register 2 are limited to the error data that are successively updated, so that a small memory capacity will suffice.

Error holding register 2 can be configured with simple delay elements, preventing an increase of the circuit area. Further, error holding register 2 is provided with a reset function to clear the stored data to 0 when the target pixel is located at the head position on a line or on the top line of an image, to prevent inconvenience due to discontinuity of the error data. It is also provided with a function, when the target pixel is located on the top line of an image plane, to suppress reading from the line register or a reset function to clear the data stored in error data memory 3 to 0.

It is unnecessary to design the computing unit to operate exactly in the same procedure as described above, as long as the orders for updating error data memory 3 and error holding register 2 are not reversed from each other. Since there is no possibility, from the characteristics of calculations, that the updating orders of error data memory 3 and register X in error holding register 2 are reversed from each other, it is only necessary to carefully decide the updating orders of registers Y and Z of error holding register 2 when designing.

Figure 6:
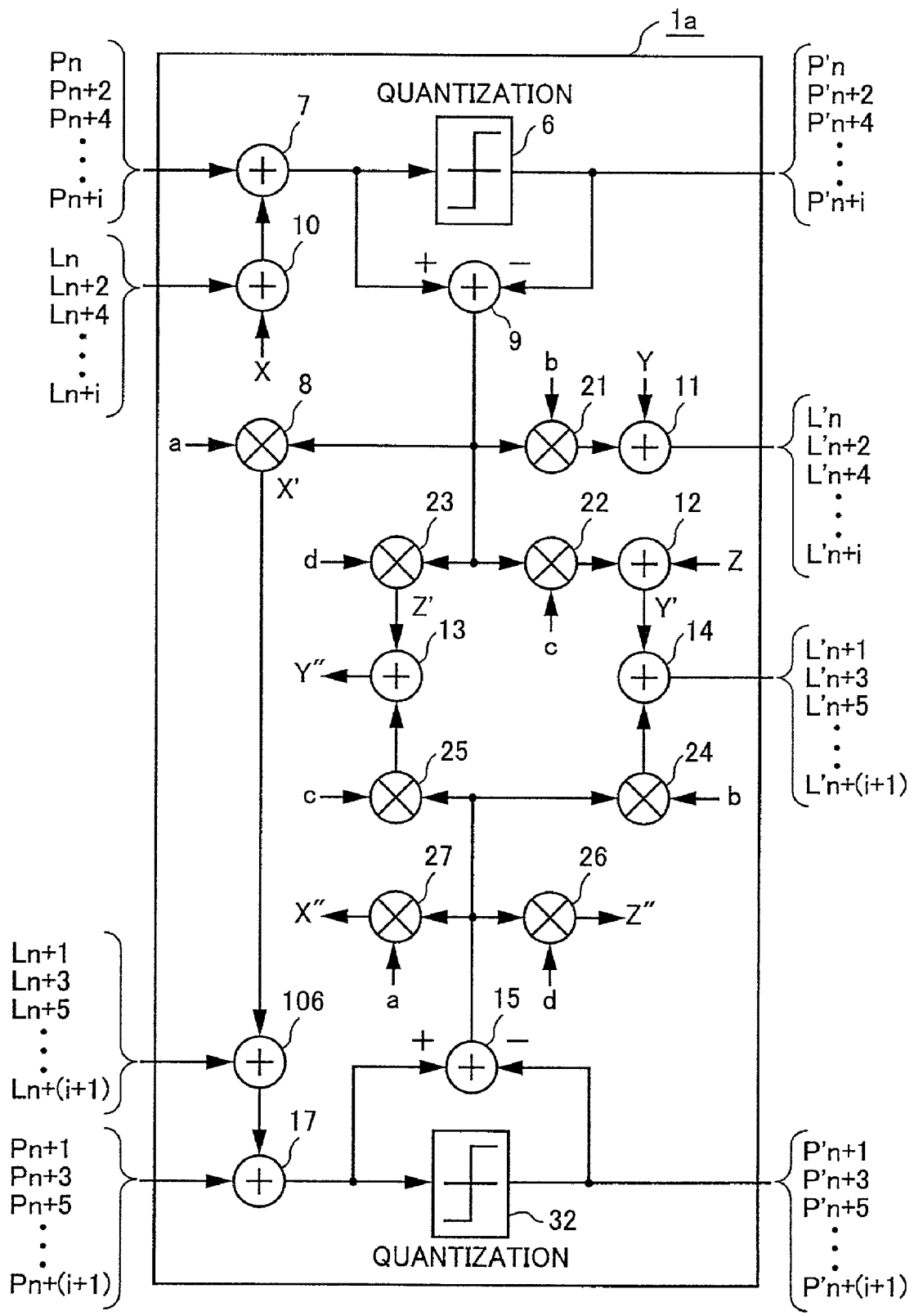
FIG. 6 is a block diagram showing an error diffusion computing device according to a further embodiment of the present invention.

FIG. 6 shows an embodiment in which two target pixels are being processed in parallel at the same time. The embodiment shown in FIG. 6 requires only registers X, Y and Z as error holding register 2, as in the embodiment shown in FIG. 4, and reading and writing with respect to error data memory 3 are necessary just one time each for each pixel. It is found that this technique is suitable for the data driven type computing device in which neighboring pixels can be taken into error diffusion computing device 1a in a same packet at one time. The numbers of remaining elements, i.e., quantizers, adders and multipliers are simply doubled. More specifically, compared to the embodiment in FIG. 4 including one quantizer, five adders and four multipliers, the embodiment shown in FIG. 6 includes two quantizers, ten adders and eight multipliers, and there is no additional circuit that becomes necessary because of the parallel configuration. Thus, it is found that this embodiment is advantageous as the number of registers for error holding register 2 is not doubled.

Basically, the present embodiment has a circuit configuration that corresponds to the case where two sets of the circuits of the embodiment shown in FIG. 4 are arranged in parallel. Thus, the operations are identical thereto, and detailed description thereof will not be repeated. The distinction of the present embodiment is as follows. Unlike the embodiment in FIG. 4 in which error data X', Y' and Z' are stored in error holding register 2, in the embodiment shown in FIG. 6, they are not written into the register first, but directly used for the processing of the next target pixel. After the processing of the next target pixel is completed, the error data X', Y' and Z' are written into the respective registers and stored therein. That is, registers X, Y and Z are updated only after processing of every second target pixel, and therefore, it is unnecessary to double the number of registers of error holding register 2 in the parallel configuration. The capacity of the register 2 required for the embodiment in FIG. 6 is the same as in the embodiment in FIG. 4.

Figure 12:
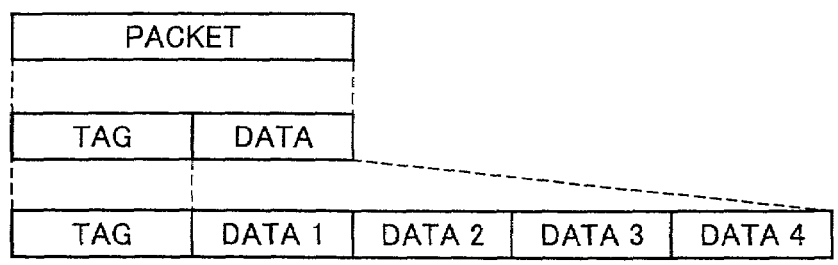
FIG. 12 shows a model of a packet for use in a conventional data driven type information processing device.

Further, the embodiment shown in FIG. 6 can readily match the parallel processing of the data driven type computing device wherein a plurality of pieces of data, i.e., data of adjacent pixels (data 1, data 2) in this case, are stored and transferred in a same packet as shown in FIG. 12, and therefore, it can bring out the advantage of the parallel processing.

The method explained above, following the principle of the error diffusion, is a method of storing quantization error multiplied by a coefficient in the error data memory. However, if error diffusion computing device 1a is configured to diffuse the error to pixels of a range beyond error holding register 2 built therein, this method is difficult to utilize and lacks in the degree of freedom. To solve this problem, the embodiment shown in FIG. 4 is provided with a path through which the error data can be output without alteration. This configuration, however, requires a mechanism for storing the error data itself, and a circuit for outputting the unmodified error data will be wasteful if not used. Thus, another method is considered wherein error data generated by quantization is stored in error data memory 3 without alteration.

Figure 7:
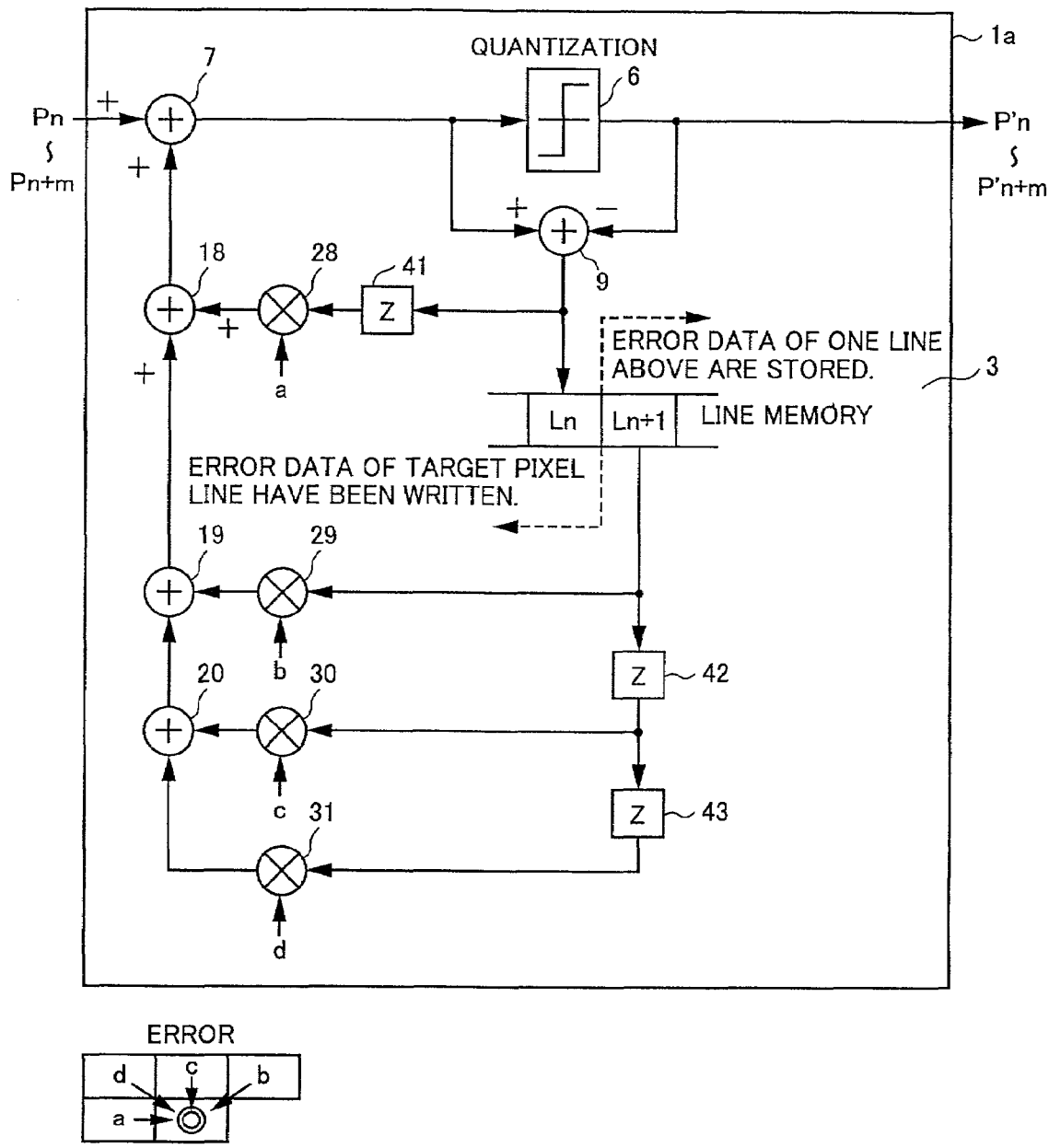
FIG. 7 is a block diagram showing an error diffusion computing device according to a still further embodiment of the present invention.
Figure 8:
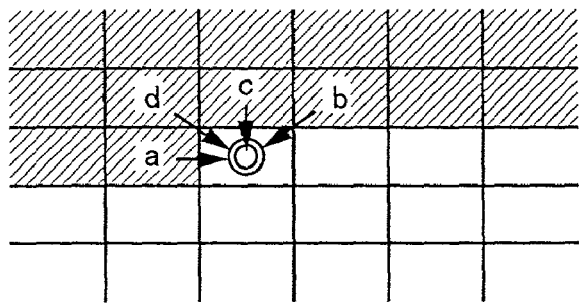
FIG. 8 illustrates error diffusion according to an embodiment of the present invention.
Figure 10A:
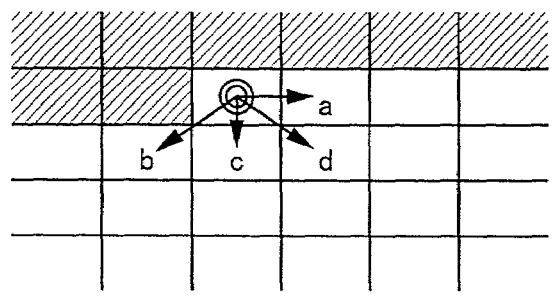
FIGS. 10A and 10B illustrate error diffusion in a conventional example.
Figure 10B:
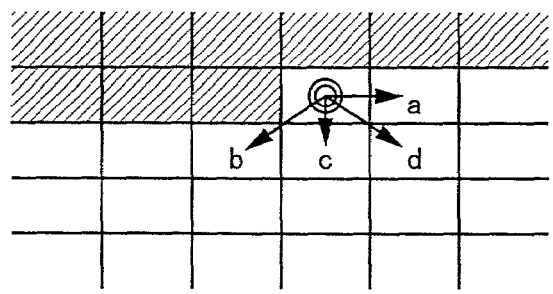

FIG. 7 shows the embodiment in which the error data of the quantized pixel is stored in error data memory 3 without alteration. In this embodiment, the error data of a pixel is multiplied by a specific coefficient before being added to target pixel data. The distinction of this embodiment will now be described with reference to FIG. 8. In FIG. 8, the target pixel whose error is being diffused is located at the same position as in the conventional example shown in FIG. 10. In FIG. 10, the error data of the pixel for which quantization was finished is added to data of the pixels for which quantization is not yet finished. Thus, the arrows are directed from the target pixel having undergone the operation to the pixels yet to undergo the quantization. By comparison, in FIG. 8, the arrows are directed from the pixels having undergone the quantization to the target pixel that is to be subjected to the operation. It is understood that this method is replaceable if the directions of the arrows in FIG. 10 are taken notice to see which error data is added to which pixel.

In the embodiment shown in FIG. 7, registers X, Y and Z of error holding register 2 are unnecessary. Instead, delay elements 41, 42 and 43 each having a delay amount equivalent to the time required for transition to the processing of a next pixel are provided. Error data memory 3 stores error data of pixels located on a line immediately above the line on which the target pixel is located. The stored data are updated when the error diffusion processing of the target pixel is completed.

Assume that the error diffusion processing is conducted for target pixel Pn+1. In this case, the error data of the preceding pixel Pn (having been written in a region Ln of the error data memory at an address corresponding to pixel Pn) is passed through delay element 41, and is multiplied by coefficient "a" in a multiplier 28. The error data of pixels on the line preceding (or above) the line on which target pixel Pn+1 is located are successively read out from the region Ln+1 of the error data memory 3.

First, the error data of pixel P'n+2 located upper right of the target pixel is multiplied by coefficient "b" in a multiplier 29. Next, the error data of pixel P'n+1 located immediately above the target pixel is passed through a delay element 42 and multiplied by coefficient "c" in a multiplier 30. The error data of pixel P'n located upper left of the target pixel is passed through a delay element 43, and is multiplied by coefficient "d" in a multiplier 31. The outputs of these multipliers 28–31 are added in adders 18–20, which is further added to pixel data Pn+1 in an adder 7. The result is input to a quantization circuit 6 for binarization, for example, and the error data generated is written into error data memory 3 at an address (Ln+1) corresponding to the pixel Pn+1.

The procedure described above is repeated to complete the error diffusion processing. Writing to and reading from error data memory 3 are each one time for one target pixel. Thus, the processing speed is not degraded compared to the embodiments shown in FIGS. 4 and 6. It is also understood that the present embodiment can be achieved with a simple circuit configuration.

With this method, it is also possible to realize parallel processing using two sets of the circuits for processing pixel data Pn and Pn+1. As described in conjunction with FIG. 6 above, the present embodiment again readily matches the parallel processing of the data driven type computing device in which a packet (data 1, data 2) storing data of adjacent pixels, for example, is transferred for processing, and therefore, it is able to derive the advantage of the parallel processing. The error data that are stored in error data memory 3 are those unmodified, to which no coefficient has been multiplied. Thus, the degree of freedom after processing increases, so that it is applicable not only to the case where the error is diffused to four pixels surrounding the target pixel, but also to any other diffusion manners.

The circuit scale of the embodiment shown in FIG. 7 is the same as those in FIGS. 4 and 6. Specifically, the embodiment of FIG. 7 can be realized with one quantizer, five adders and four multipliers, and reading from and writing to error data memory 3 are required one time each, as in FIGS. 4 and 6. In FIG. 7, the data read from error data memory 3 is used unmodified but delayed, and therefore, delay elements Z commonly used for digital signal processing have been utilized for implementation of this embodiment. In practice, however, these elements may be readily embodied with the same configuration as error holding register 2 used, e.g., in FIG. 4, and same applies to FIG. 4. Specifically, in FIG. 4, the delay elements may be employed, which can be interposed between X' X. In other words, error holding register 2 can readily be configured with delay elements.

Figure 9:
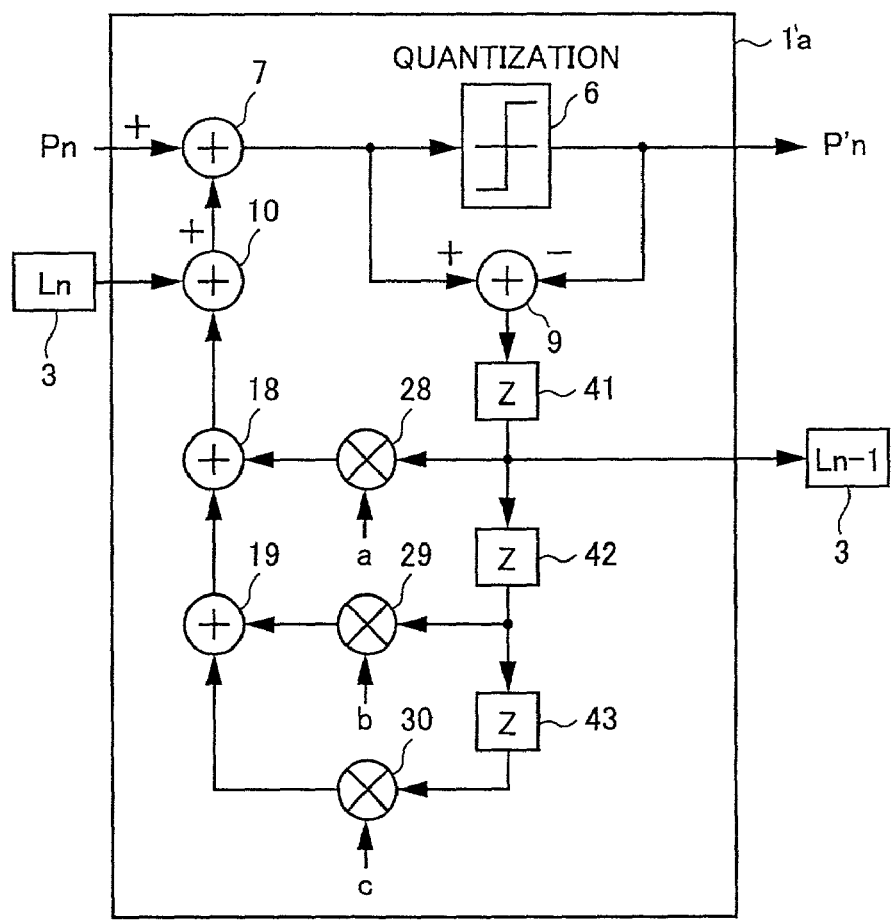
FIG. 9 is a block diagram showing an error diffusion computing device according to yet another embodiment of the present invention.
Figure 9:
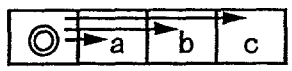

FIG. 9 is a block diagram showing an embodiment in which the error holding register within the error diffusion computing device is implemented in one dimension (only in a line direction). Although this embodiment can also be configured in different ways, FIG. 9 shows the configuration employing circuits similar to those in FIG. 7. Compared to the preceding embodiments wherein the error diffusion on the same line has been restricted to one pixel, in the embodiment shown in FIG. 9, the error is diffused to three pixels in one direction on the same line, taking extensibility into account. Errors of pixels on a different line can also be sent/received as described above using data memory 3. However, in order to show a circuit configuration excellent in extensibility, the portion for multiplying the error data by coefficients and adding them to the target pixel data is not illustrated in FIG. 9. A function for calculating and accumulating the errors of pixels, corresponding to the portion for reading from and writing to error data memory 3, may be provided. Further, to put emphasis on the extensibility, it may be controlled by software using another computing device.

Hereinafter, for simplification of explanation, reading and writing of error data with respect to error holding register 2 within error diffusion computing device 1a will be described exclusively. In this embodiment, the error data of target pixel Pn is multiplied by coefficient "a" multiplier 28 and added to data of next pixel Pn+1, multiplied by coefficient "b" in multiplier 29 and added to data of pixel Pn+2, and also multiplied by coefficient "c" in multiplier 30 and added to data of pixel Pn+3. Accordingly, the error data is diffused to the three pixels on the same line.

As shown in FIG. 9, pixel data of target pixel Pn is input to error diffusion computing device 1a. Error data Ln that is stored in error holding register 2 at an address corresponding to pixel Pn is read out and added to the pixel data of pixel Pn in adder 7. The result is input to quantization circuit 6 for binarization, for example. The error data calculated at the time of quantization in adder 9 is passed through delay element 41, so that it is delayed by one pixel. It is multiplied by coefficient "a" in multiplier 28, and the result is added to pixel data Pn+1 in adder 7. Next, the error data is further passed through delay element 42, and thus, it is delayed by two pixels. It is multiplied by coefficient "b" in multiplier 29, and the result is added to pixel data Pn+2 in adder 18. The error data is still further passed through delay element 43 and thus delayed by three pixels. It is multiplied by coefficient "c" in multiplier 30, and the resultant value is added to pixel data Pn+3 in adder 19.

For writing to error holding register 2 (for updating), the quantization error data of pixel Pn is delayed by one pixel by delay element 41, and is stored in error holding register 2 at an address (Ln−1) corresponding to the error data of pixel Pn−1. Repeating the procedure successively, the error diffusion to three pixels on the same line is accomplished.

Again with this method, it is possible to perform parallel processing by arranging two sets of the circuits in parallel to process pixel data Pn and Pn+1. As described above in conjunction with FIG. 6, it can readily match the parallel processing of the data driven type computing device in which a packet (data 1, data 2) storing the data for adjacent two pixels, for example, is transferred for processing, and therefore, the advantage of the parallel processing can be enjoyed.

To avoid simultaneous reading and writing with respect to the same address, it is configured such that the error data is delayed by one pixel before being written into error holding register 2. It is intended to avoid the constraint of circuit operation, as it is necessary to complete reading before writing when performing reading and writing for the same address. However, if there is a severe constraint against changing the address, the error data of the target pixel before being passed through a delay element can be written into error holding register 2 at the same address of Ln.

Although it has been explained to scan the target pixels on one line from left to right, the present invention is not limited thereto. The scanning direction may alternate between from left to right and from right to left, or they may be switched in prescribed periods.

Further, error diffusion computing device 1a may automatically perform, when the target pixel is located at the head position of a line, the processes to clear error holding register 2 and to suppress reading of the error data from error data memory 3 or to clear the error data memory. Alternatively, these processes may be expressed by programs.

The threshold value for quantization may be fixed or changed arbitrarily. The error diffusion computing device may be configured to sequentially change the threshold values according to pixels. Further, the quantization is not limited to obtain binary data. It may also be performed to obtain quaternary data. As an example of quaternary quantization, the case of six colors can be considered. Of three colors of yellow, magenta and cyan, light tone and dark tone are prepared for cyan, for example, which are expressed in two bits as 11, 10, 01 and 00. The dark tone is used for printing when the upper bit is 1, while the light tone is used for printing when the lower bit is 1 (0 means no printing). Printing both with the dark tone and the light tone results in the darkest tone, and therefore, four levels of shading can be expressed. Various kinds of modifications may be applied thereto.

As explained above, according to the present invention, unlike the conventional data driven type computing unit that is advantageous in image processing because of its parallelism but is unsuitable for error diffusion, it becomes possible to efficiently perform error diffusing operations with data driven type operations, and to obtain advantages of the data driven type processing device.

Further, a plurality of processing units can be arranged in parallel, without considerably increasing the circuit scale, and the error data can be stored in a small memory capacity. When processing packets with the data driven type processing device, a plurality of pieces of error data may be stored in a same packet for processing, so that the advantage of high-speed processing, which is characteristic of the data driven type processing device, can be enjoyed. In addition, by storing the plurality of pieces of data within the same packet, the time required for input/output is reduced, so that it is applicable to data transmission and processing of even higher speed.

In the description above, two processing blocks arranged in parallel have been given as an example. However, not limited thereto, any number of processing blocks for parallel processing of a plurality of pieces of data can be utilized. The number of data blocks within a packet can be increased accordingly, whereby the advantage of the data driven type processing device can further be enjoyed. Accordingly, the data driven type processing device that is suitable for high-speed processing of a large amount of data operations, such as image processing, can be employed for the error diffusion processing, maintaining the advantage of the high-speed processing derived from the parallel processing.

When the quantization error data of a target pixel is being diffused to its neighboring pixels, the error data necessary for processing the next pixel can be stored in the error holding register provided within the error diffusion computing device, which can be readily read and updated. This reduces the time for accessing the external memory, and increases the speed of packet flow. Accordingly, the entire processing time can be reduced.

Still further, the access portion to a memory other than the computing unit is separated from the error diffusion computing device having the error holding register provided therein and performing the error diffusion operations. This allows for a configuration that eliminates unnecessary waiting time for the memory access and others during the packet processing. It also becomes possible to manage the data flow through the two blocks by the merging and branching portions, so that it becomes agreeable to the data driven type system configuration.

Accordingly, by employing a data driven type processing device, it becomes possible to provide a processing device not only promising high-speed processing but also advantageous in terms of circuit scale.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type processing device with an error diffusion computing unit built therein, comprising:
   an error holding register placed in said error diffusion computing unit for successively storing and updating a value within error information of a pixel that is to be diffused to a neighboring pixel being processed continuously; and
   an error data memory provided external to said error diffusion computing unit for storing and updating said value that is to be diffused to another neighboring pixel being processed discontinuously,
   wherein said error diffusion computing unit stores said error information and said value to be diffused within a packet, and performs an operation by causing the packet to be circulated.

2. The error diffusion processing device according to claim 1, wherein
   said error diffusion computing unit includes a plurality of computing units for parallel processing,
   said plurality of computing units commonly access said error holding register and said external memory, and
   information to be processed is stored within the same packet.

3. The error diffusion processing device according to claim 1, wherein said error diffusion computing unit clears a content of said error holding register when a target pixel being processed is located in a head position on a line.

4. The error diffusion processing device according to claim 1, wherein said error diffusion computing unit suppresses reading from said external memory when a target pixel being processed is located on a top line of an image plane.

5. A data driven type processing device having an error diffusion computing unit built therein and further comprising an access portion for accessing an external memory, wherein
   said error diffusion computing unit includes an arithmetic portion provided separately from said access portion for accessing an error holding register provided in said error diffusion computing unit to perform an operation for error diffusion, and
   said error diffusion computing unit stores error information and a value to be diffused within a packet, and performs the operation by causing the packet to be circulated through said access portion and said arithmetic portion.

6. The error diffusion processing device according to claim 5, wherein
   said arithmetic portion includes a plurality of arithmetic portions for parallel processing,
   said plurality of arithmetic portions commonly access said error holding register and said external memory, and
   information to be processed is stored in the same packet.

7. The error diffusion processing device according to claim 5, wherein said error diffusion computing unit clears a content of said error holding register when a target pixel being processed is located in a head position on a line.

8. The error diffusion processing device according to claim 5, wherein said error diffusion computing unit suppresses reading from said external memory when a target pixel being processed is located on a top line of an image plane.

* * * * *